X000001
July 31, 1790

The United States.

To all to whom these Presents shall come Greeting.

Whereas Samuel Hopkins of the City of Philadelphia and State of Pensylvania hath discovered an Improvement, not known or used before such Discovery, in the making of Pot ash and Pearl ash by a new Apparatus and Proceſs; that is to say, in the making of Pearl ash 1st. by burning the raw Ashes in a Furnace, 2d. by diſsolving and boiling them when so burnt in Water, 3rd. by drawing off and settling the Ley, and 4th. by boiling the Ley into Salts which then are the true Pearl ash; and also in the making of Pot ash by fluxing the Pearl ash so made as aforesaid; which Operation of burning the raw Ashes in a Furnace, preparatory to their Diſsolution and boiling in Water, is new, leaves little Residuum, and produces a much greater Quantity of Salt: These are therefore in pursuance of the Act, entituled "An Act to promote the Progreſs of useful Arts", to grant to the said Samuel Hopkins, his Heirs, Administrators and Aſsigns, for the Term of fourteen Years, the sole and exclusive Right and Liberty of using, and vending to others the said Discovery, of burning the raw Ashes previous to their being diſsolved and boiled in Water, according to the true Intent and Meaning of the Act aforesaid. In Testimony whereof I have caused these Letters to be made patent, and the Seal of the United States to be hereunto affixed. Given under my Hand at the City of New York this thirty first Day of July in the Year of our Lord one thousand seven hundred & Ninety.

G Washington

City of New York July 31st. 1790. –

I do hereby Certify that the foregoing Letters patent were delivered to me in pursuance of the Act, entituled "An Act to promote the Progreſs of useful Arts"; that I have examined the same, and find them conformable to the said Act.

Edm: Randolph Attorney General for the United States. –